(12) United States Patent
Feeley et al.

(10) Patent No.: US 11,203,426 B1
(45) Date of Patent: Dec. 21, 2021

(54) DUCT VANE ROTATION SYSTEM

(71) Applicant: Bell Textron Inc., Fort Worth, TX (US)

(72) Inventors: Elizabeth Feeley, Dallas, TX (US); Karl H. Schroeder, Southlake, TX (US)

(73) Assignee: Textron Innovations Inc., Fort Worth, TX (US)

( * ) Notice: Subject to any disclaimer, the term of this patent is extended or adjusted under 35 U.S.C. 154(b) by 59 days.

(21) Appl. No.: 16/903,831

(22) Filed: Jun. 17, 2020

(51) Int. Cl.
| | |
|---|---|
| *B64C 11/00* | (2006.01) |
| *B64C 27/82* | (2006.01) |
| *B64C 29/00* | (2006.01) |
| *B64C 11/32* | (2006.01) |
| *B64C 13/38* | (2006.01) |

(52) U.S. Cl.
CPC ........ *B64C 29/0033* (2013.01); *B64C 11/001* (2013.01); *B64C 11/32* (2013.01); *B64C 13/38* (2013.01); *B64C 2027/8254* (2013.01)

(58) Field of Classification Search
CPC ............ B64C 27/20; B64C 2027/8254; B64C 2027/8272; B64C 11/001; B64C 9/38
See application file for complete search history.

(56) References Cited

U.S. PATENT DOCUMENTS

| | | | | |
|---|---|---|---|---|
| 2,953,320 A | * | 9/1960 | Parry | B64C 39/06 244/12.2 |
| 3,222,012 A | * | 12/1965 | Piasecki | B64C 27/82 244/51 |
| 3,260,482 A | * | 7/1966 | Stroukoff | B64C 27/82 244/51 |
| 4,795,111 A | * | 1/1989 | Moller | B64C 27/20 244/23 C |
| 5,131,603 A | * | 7/1992 | Meyers | B64C 27/82 239/265.19 |
| 5,170,963 A | * | 12/1992 | Beck, Jr. | B64C 39/064 244/12.2 |
| 5,421,538 A | * | 6/1995 | Vassa (Suratano Thienphropa) | B64C 27/20 244/100 R |
| 6,607,162 B2 | * | 8/2003 | Warsop | B64C 39/062 244/12.6 |
| 7,281,680 B2 | * | 10/2007 | Melkuti | B64C 27/20 244/12.1 |
| 8,464,978 B2 | * | 6/2013 | Yim | B64C 29/0033 244/17.23 |
| 8,511,602 B2 | * | 8/2013 | Campbell | B64C 27/20 244/23 D |
| 9,950,789 B2 | * | 4/2018 | Tsunekawa | B64C 27/20 |

* cited by examiner

*Primary Examiner* — Brian M O'Hara
(74) *Attorney, Agent, or Firm* — Patent Capital Group

(57) ABSTRACT

One embodiment is a rotor system comprising a duct ring; a hub disposed centrally to the duct ring; first and second stators each connected between the duct ring and the hub; first and second control vanes rotatably connected to the first and second stators, respectively; and a structural hoop having a first end connected to the first control vane and a second end connected to the second control vane, the structural hoop for translating rotation of the first control vane about a vane axis to the second control vane.

20 Claims, 16 Drawing Sheets

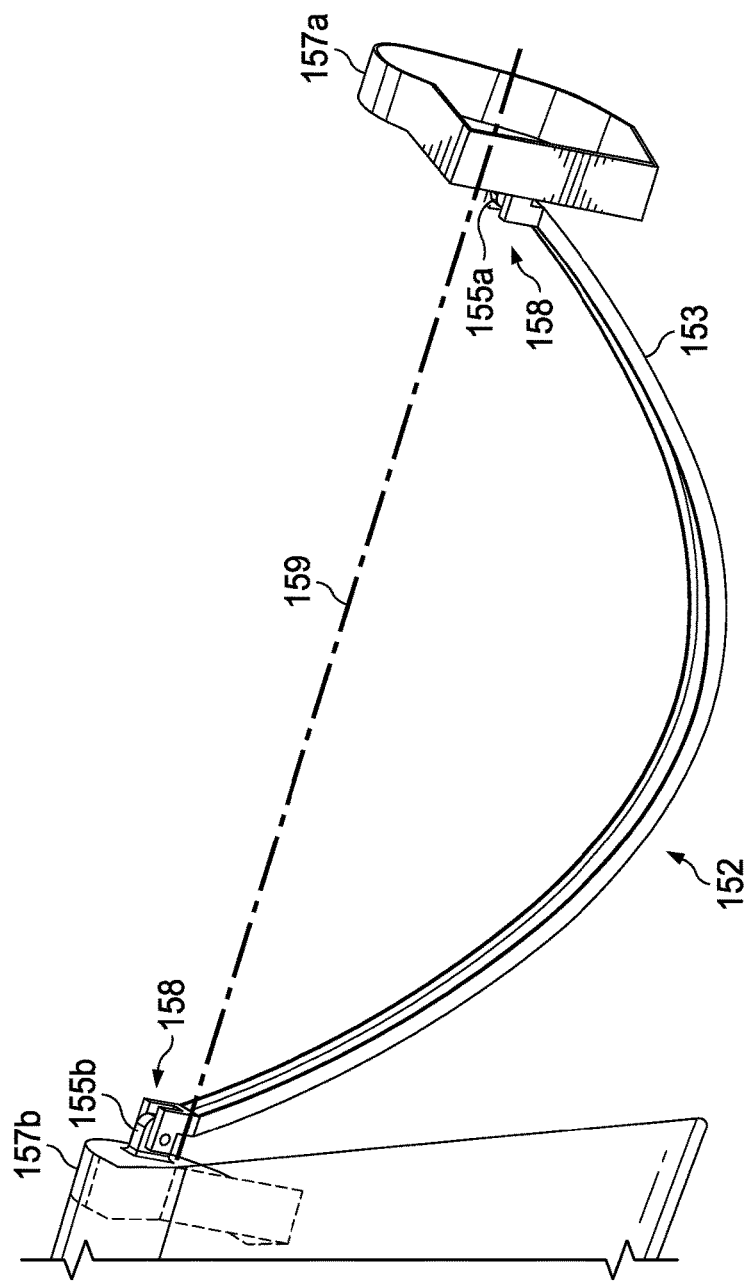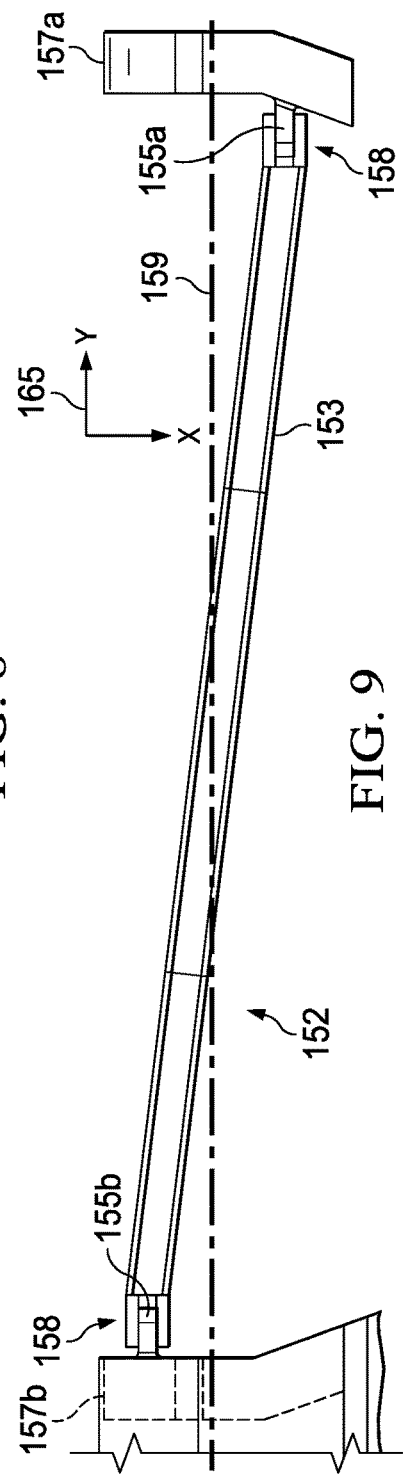

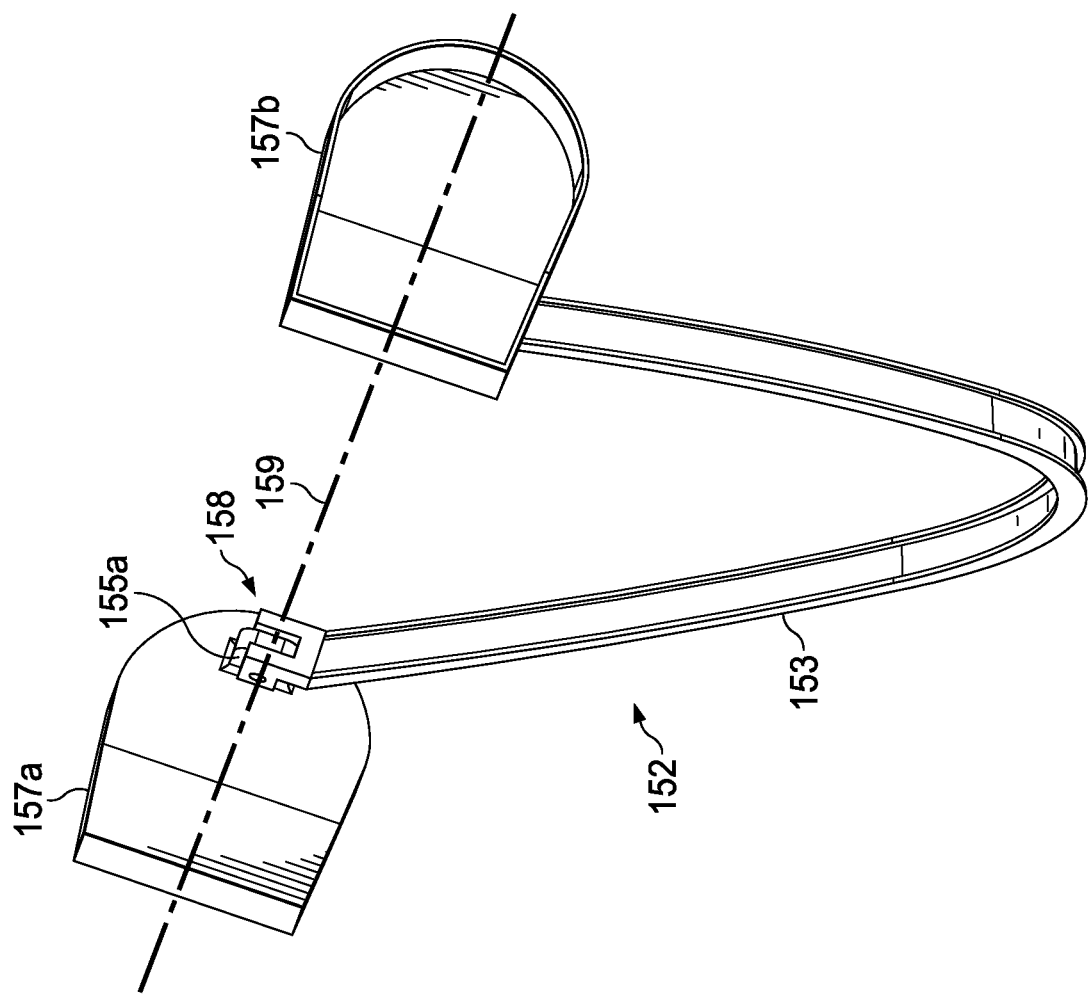
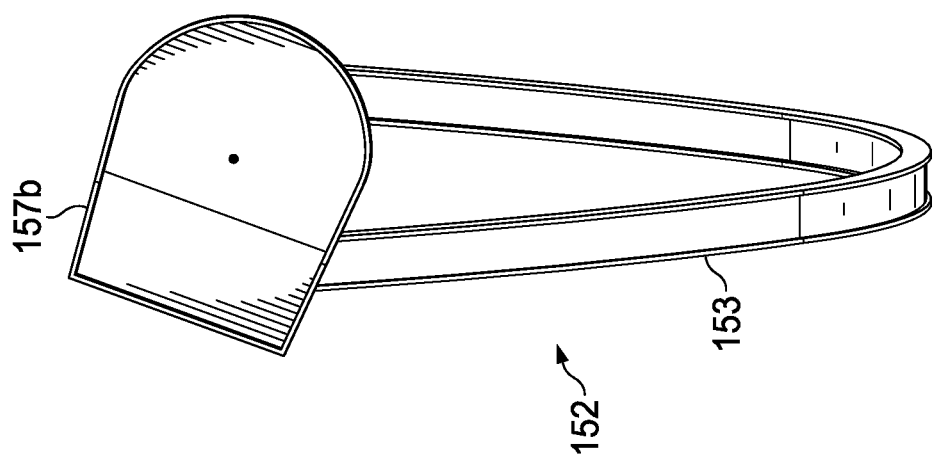

DUCT VANE ROTATION SYSTEM

TECHNICAL FIELD

This disclosure relates in general to the field of aircraft and, more particularly, though not exclusively, to a duct vane rotation system for such aircraft.

BACKGROUND

Ducted-rotor aircraft have at least one ducted rotor for providing lift and propulsion forces. Each ducted rotor typically has internal structure that supports a motor of the aircraft and an aerodynamic exterior skin.

SUMMARY

One embodiment is a rotor system comprising a duct ring; a hub disposed centrally to the duct ring; first and second stators each connected between the duct ring and the hub; first and second control vanes rotatably connected to the first and second stators, respectively; and a structural hoop having a first end connected to the first control vane and a second end connected to the second control vane, the structural hoop for translating rotation of the first control vane about a vane axis to the second control vane.

Another embodiment is an aircraft comprising a fuselage; and a rotor system comprising a duct ring; a hub disposed centrally to the duct ring; first and second stators each connected between the duct ring and the hub; first and second control vanes rotatably connected to the first and second stators, respectively; and a structural hoop having a first end connected to the first control vane and a second end connected to the second control vane, the structural hoop for translating rotation of the first control vane about a vane axis to the second control vane.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIGS. 7A-9 are more detailed illustrations of the duct vane rotation system of the duct as depicted in FIG. 5;

FIGS. 12A-12C illustrate relative positions of various structural elements of the duct as depicted in FIG. 5 when the duct vane rotation system is rotated about a vane hinge line to a maximum degree in a second (negative) direction.

DETAILED DESCRIPTION

Figure 1:
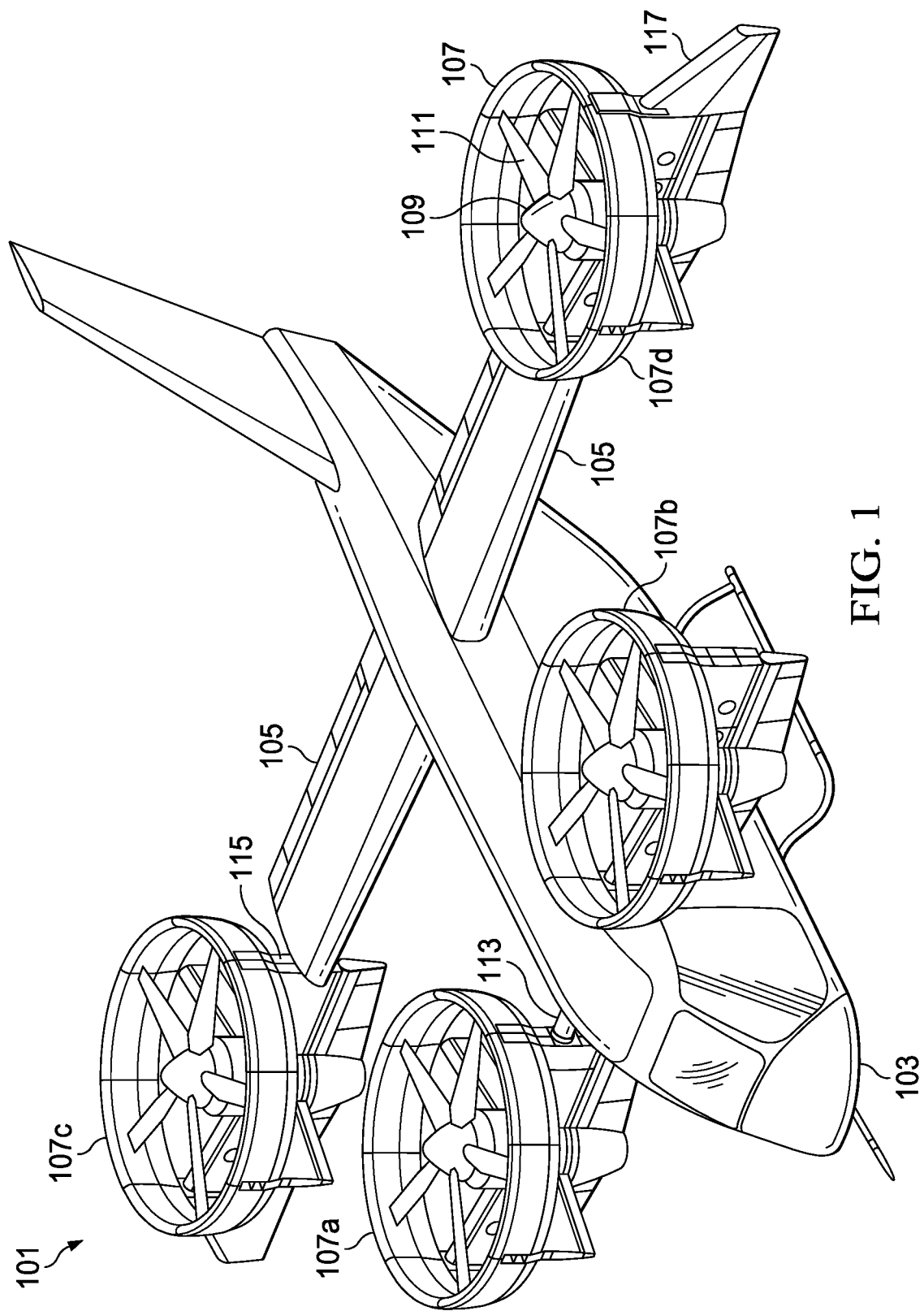
FIGS. 1 and 2 illustrate perspective views of an example tiltrotor aircraft in which a duct vane rotation system in accordance with embodiments described herein may be implemented and showing the aircraft configured to operate in a helicopter mode and an airplane mode, respectively.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a duct vane rotation system for a ducted fan rotor. The mechanism includes a structural hoop having first and second ends connected to closeout ribs of the inboard and outboard vanes, respectively, through spherical joints. The mechanism allows for rotation of both vanes about a hinge line axis and rotation of the structural hoop about a duct centerline axis. In particular embodiments, the mechanism allows for vane rotation of approximately +/−25 degrees about the hinge line axis and prevents rotation of the structural hoop about the hinge line axis.

Figure 2:
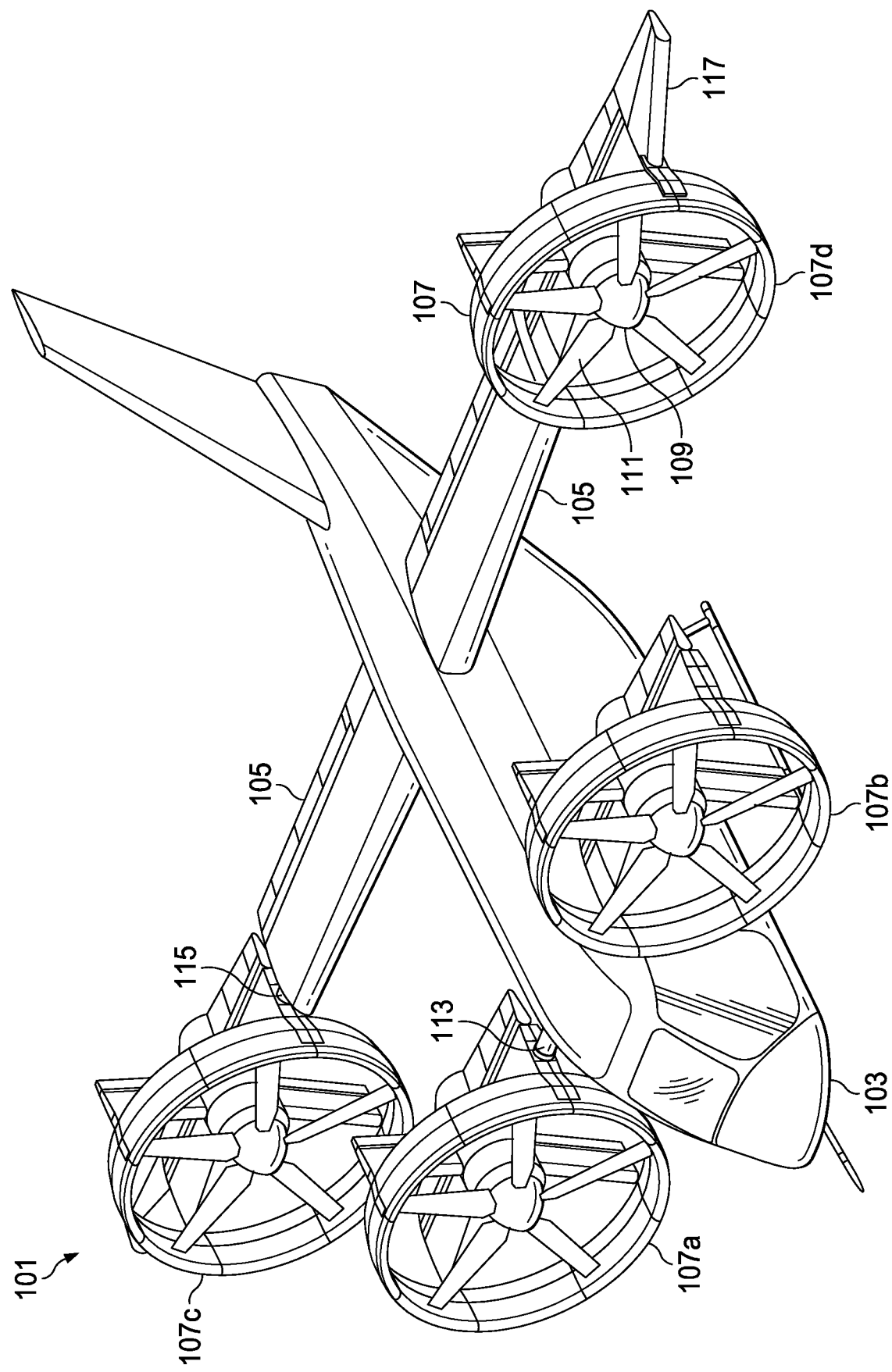

FIGS. 1 and 2 illustrate an example tiltrotor aircraft 101 that includes ducted rotors (or fans). Tiltrotor aircraft 101 is convertible between a helicopter mode (shown in FIG. 1), which allows for vertical takeoff and landing, hovering, and low speed directional movement, and an airplane mode (shown in FIG. 2), which allows for forward flight as well as horizontal takeoff and landing.

Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

In the illustrated embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a respective spindle 113. Ducts 107c and 107d are each independently coupled to a corresponding end of wing 105 via a respective spindle 115. As shown, each of ducts 107c and 107d includes a winglet 117 that is coupled thereto. It should be appreciated that aircraft 101 is not limited to the illustrated configuration having four ducts 107, and that aircraft 101 may alternatively be implemented with more or fewer ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight. In particular, in airplane mode, ducts 107 direct their respective thrusts in the aft direction to propel aircraft 101. Aircraft 101 is operable to fly in all directions during the vertical takeoff and landing (i.e., helicopter) mode configuration of FIG. 1, although faster forward flight is achievable while in the forward flight (i.e., airplane) mode configuration of FIG. 2. Ducts 107 may be tiltable between the vertical and horizontal positions by spindles 113, 115, which are rotatable in response to commands originating from a pilot and/or a flight control system of the aircraft 101.

Figure 3:
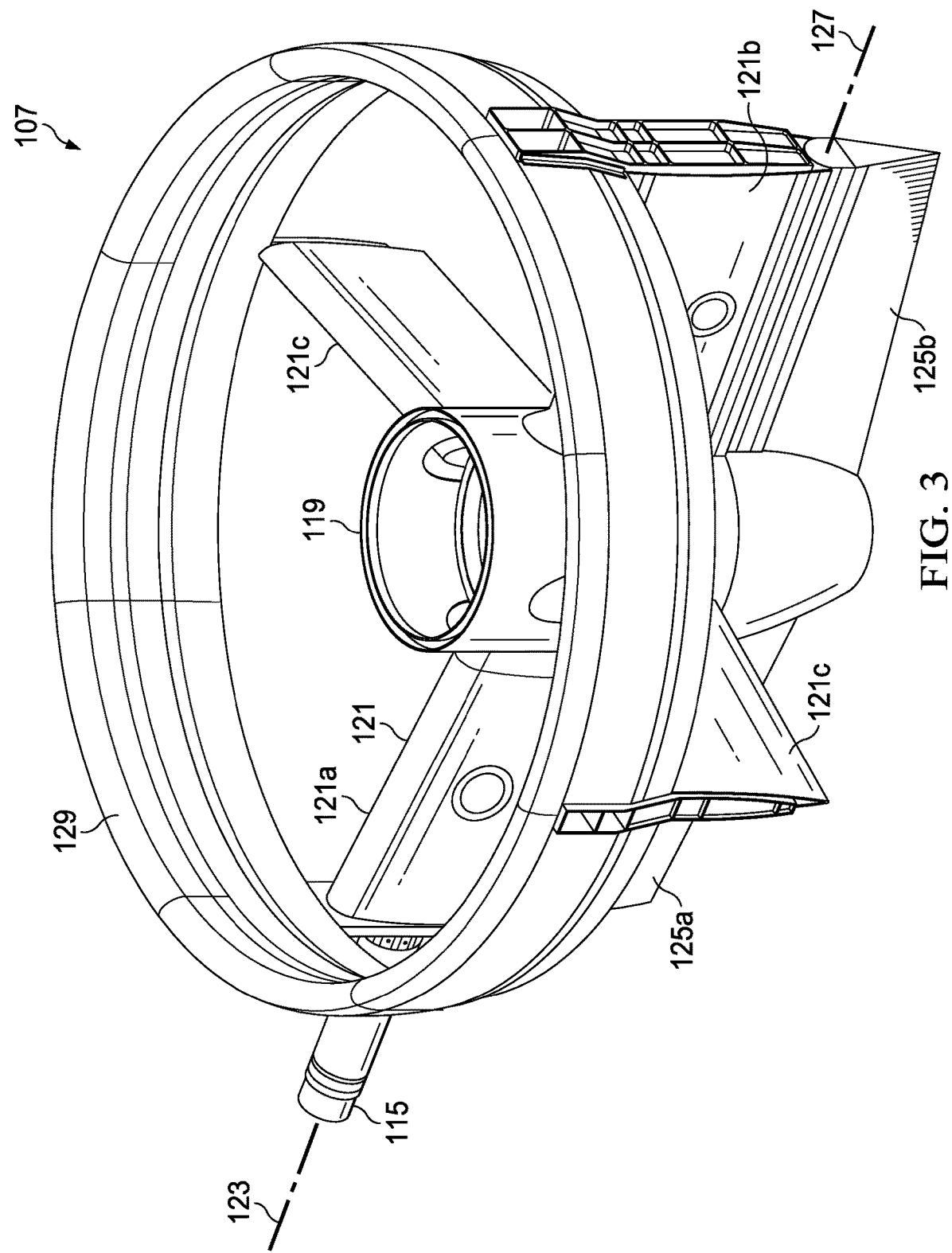
FIG. 3 illustrates a perspective view of a duct of the aircraft depicted in FIGS. 1 and 2.

FIG. 3 is a top perspective view of duct 107 without rotor 109. Duct 107 includes a central hub 119 that is configured to support and house a rotor 109 and/or other components. Duct 107 further includes a plurality of stators 121 that extend outwardly from hub 119. In this embodiment, duct 107 includes four stators 121 that extend radially outward from hub 119. More specifically, duct 107 has two primary stators that include an inboard primary stator 121a and an outboard primary stator 121b. Inboard primary stator 121a is configured to be coupled to a corresponding spindle, such as spindle 113 or spindle 115. Each duct 107 is rotatable about a spindle axis 123 that is defined by spindle 113 or spindle 115. Duct 107 also has two secondary stators 121c. Primary inboard and outboard stators 121a, 121b respectively are configured to carry a larger proportion of the load of duct 107 back to fuselage 103 than are secondary stators 121c. As shown, inboard primary stator 121a and outboard primary stator 121b are longitudinally aligned relative to each other on opposed sides of hub 119 and secondary stators 121c are longitudinally aligned relative to each other on opposed sides of hub 119 and aligned perpendicularly to inboard primary stator 121a and outboard primary stator 121b. In this regard, stators 121 are equally spaced about hub 119. It should be appreciated that duct 107 may be alternatively configured with more or fewer stators 121. It should further be appreciated that duct 107 may be alternatively configured with different spacing of stators 121 about hub 119.

Duct 107 further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, and as will be described in greater detail hereinbelow, inboard control vane 125a and outboard control vane 125b are configured to rotate together to facilitate yaw control, changes of direction, turning, etc. during flight of aircraft 101. In certain embodiments, an actuator is provided in connection with one of the control vanes (e.g., outboard control vane 125b) for directly controlling rotation of the vane, with the rotation being translated to the other control vane (e.g., inboard control vane 125a) by a duct vane rotation system such as that described hereinbelow. It should further be appreciated that duct 107 is not limited to the illustrated configuration of inboard control vane 125a and outboard control vane 125b. For example, duct 107 may alternatively be configured with additional pairs of control vanes. Duct 107 may include one or more sections of skin 129 that form an aerodynamic outer covering of duct 107, and that define an opening that extends through duct 107. As shown, hub 119 is located primarily aft of the opening.

Figure 4:
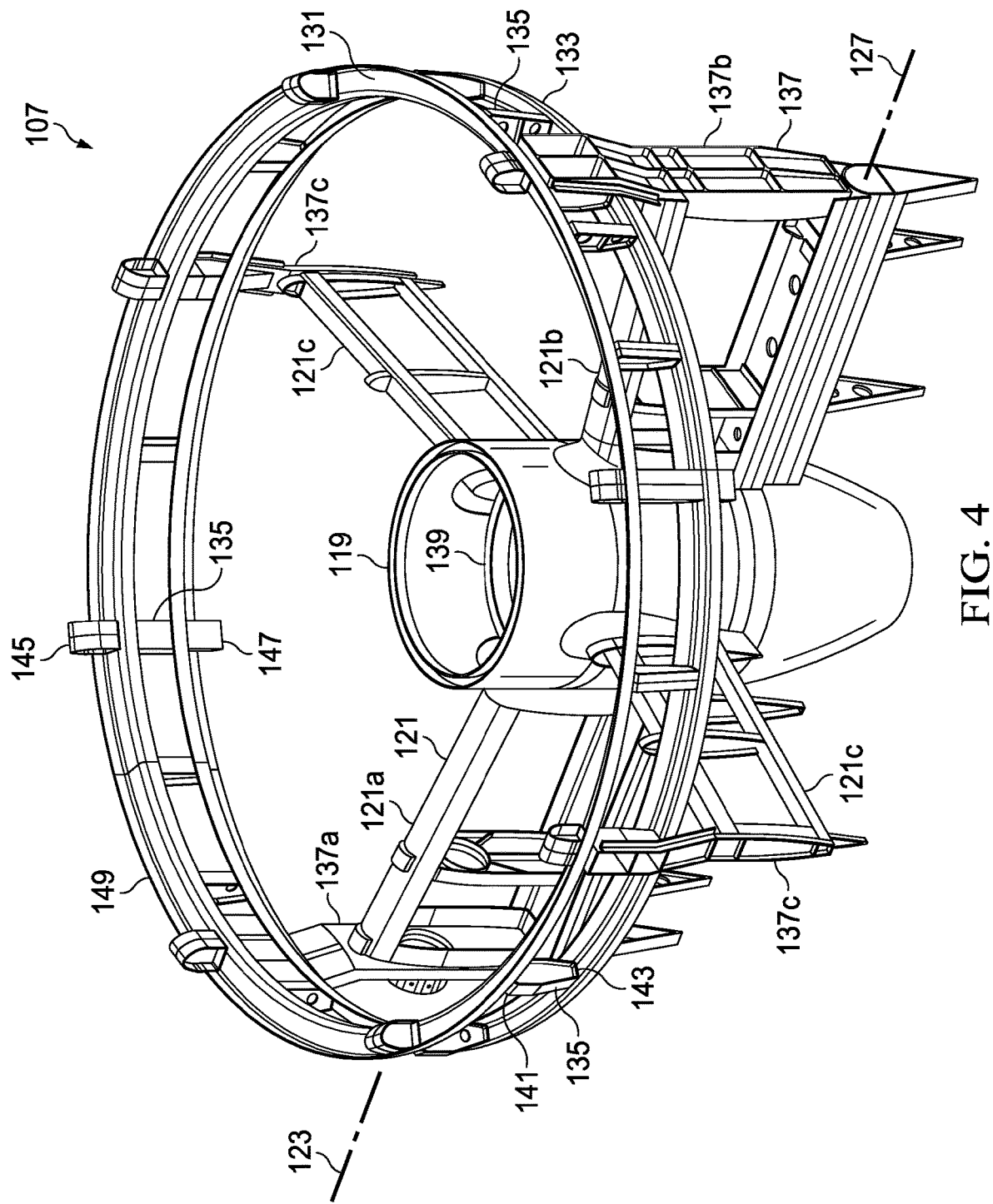
FIG. 4 illustrates a top perspective view of the duct depicted in FIG. 3 with an outer skin removed to illustrate internal components of the duct.

FIG. 4 is a top perspective view of duct 107 with aerodynamic exterior skin pieces, including skin 129, removed to illustrate inner components of duct 107. Duct 107 has a structural framework comprised of structural members. Included among structural members of duct 107 are hub 119, stators 121, an annular forward spar 131, an annular aft spar 133, a plurality of ribs 135, a plurality of fittings 137, and an inner hub assembly 139. Hub assembly 139 is configured for the attachment of a motor (not shown) thereto that drives rotor 109 and configured to facilitate the attachment thereto of other components of duct 107, such as stators 121, mechanisms for adjusting rotor pitch of blades 111, and so on.

Each rib 135 defines an upper end 141 and an opposed lower end 143. The upper end 141 of each rib 135 is configured to attach to forward spar 131, and the lower end 143 of each rib 135 is configured to attach to aft spar 133. As shown, ribs 135 may be configured with differing geometries relative to each other. For example, certain ones of ribs 135 may define one or more apertures that extend therethrough. It should be appreciated that duct 107 is not limited to the illustrated configuration of ribs 135. For example, duct 107 may be implemented with more or fewer ribs and/or with ribs having the same or different geometries as compared to ribs 135.

In the illustrated embodiment, duct 107 includes four fittings 137. Each fitting 137 is configured to couple to a second end of a corresponding stator 121. More specifically, duct 107 includes an inboard primary stator fitting 137a that is couplable to a second end of inboard primary stator 121a, an outboard primary stator fitting 137b that is couplable to a second end of outboard primary stator 121b, and two secondary stator fittings 137c that are couplable to respective second ends of secondary stators 121c. The opposed first end of each stator 121 is configured to be coupled to hub assembly 139.

In the illustrated embodiment, the structural members of duct 107 further include upper braces 145 and lower braces 147. Upper braces 145 are attached to forward spar 131 and are configured to support corresponding portions of skin 129. As shown, duct 107 includes eight upper braces 145 that are equally spaced apart around forward spar 131, attached to forward spar 131 at locations above every fitting 137 and at midpoints between adjacent fittings 137. Lower braces 147 are attached to aft spar 133 and are configured to support corresponding portions of skin 129. As shown, duct 107 includes four lower braces 147 that are spaced apart around aft spar 133, attached below corresponding upper braces 145. As shown, ribs 135 that are disposed between an upper brace 145 and a lower brace 147 may be wider than others of the plurality of ribs 135.

When assembled, as shown in FIG. 4, forward spar 131, aft spar 133, ribs 135, fittings 137, upper braces 145, and lower braces 147 together comprise a first structural portion of duct 107 that defines a duct ring 149 of duct 107. Duct ring 149 further includes one or more sections of skin 129. As shown, duct ring 149 surrounds a portion of hub 119 and defines a passage through which air moves through duct ring 149. Hub 119, stators 121, and control vane 125 together comprise a second structural portion of duct 107 that supports a motor (not shown) and rotor 109.

When ducts 107 of aircraft 101 are positioned as shown in FIG. 2 with blades 111 of rotors 109 rotating, air will move into duct rings 149 of ducts 107 past forward spars 131 as rotors 109 generate thrust that causes aircraft 101 to move in a forward direction. As air moves through ducts 107 while blades 111 of rotors 109 are rotating, the air will move past aft spars 133 and be exhausted over control vanes 125 and away from ducts 107, for example in an aft direction as aircraft 101 moves in a forward direction. In this regard, control vanes 125 are mounted aft of blades 111 of rotors 109.

One or both of forward spar 131 and aft spar 133 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 131 and aft spar 133 may be constructed from one or more layered plies of carbon-fiber-reinforced plastic (CFRP). It should be appreciated that duct 107 is not limited to an implementation having two spars such as forward spar 131 and aft spar 133. For example, duct 107 may be alternatively implemented with more or fewer spars.

Figure 5:
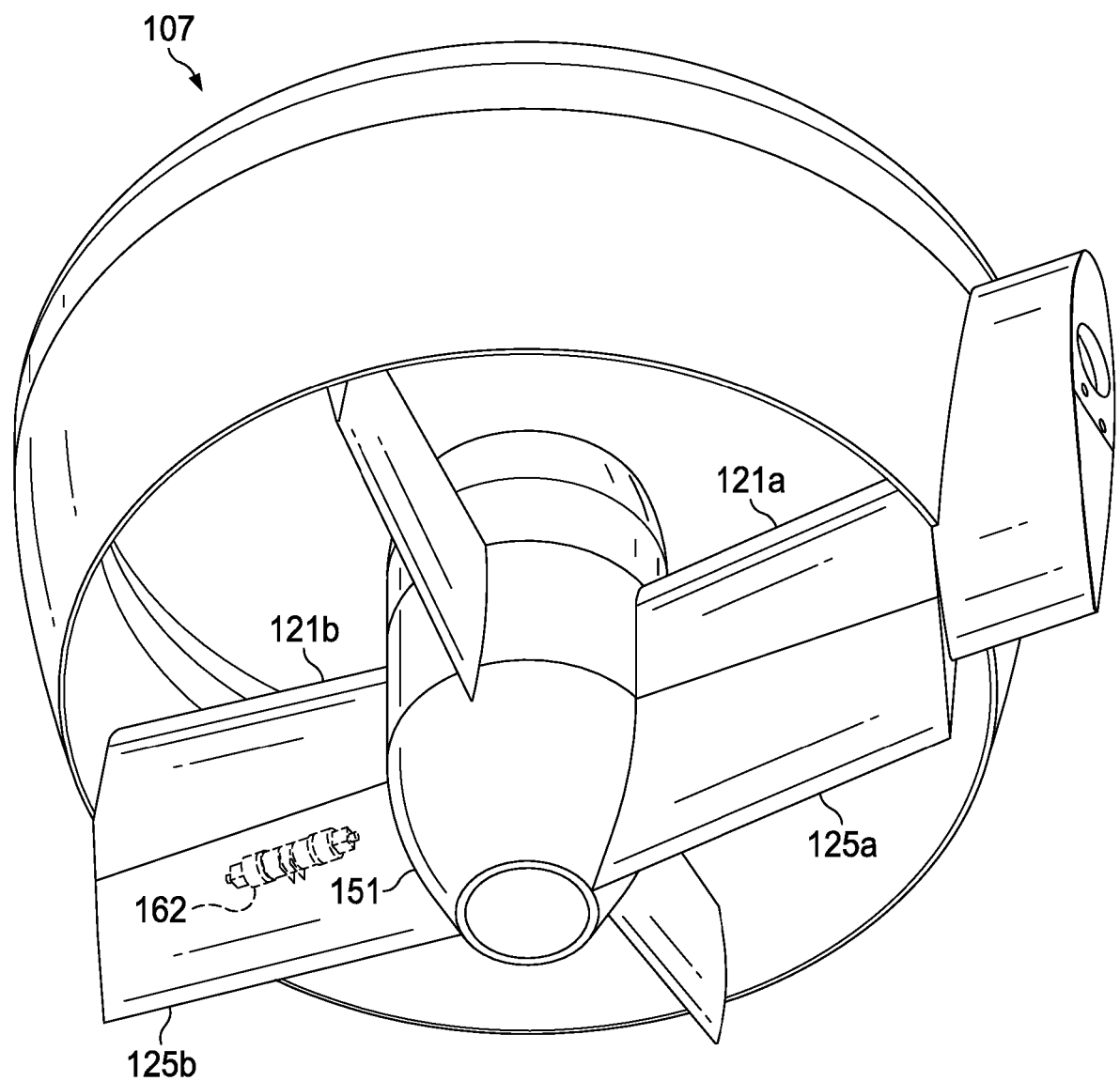
FIG. 5 illustrates a bottom perspective view of the duct depicted in FIG. 3.
Figure 6:
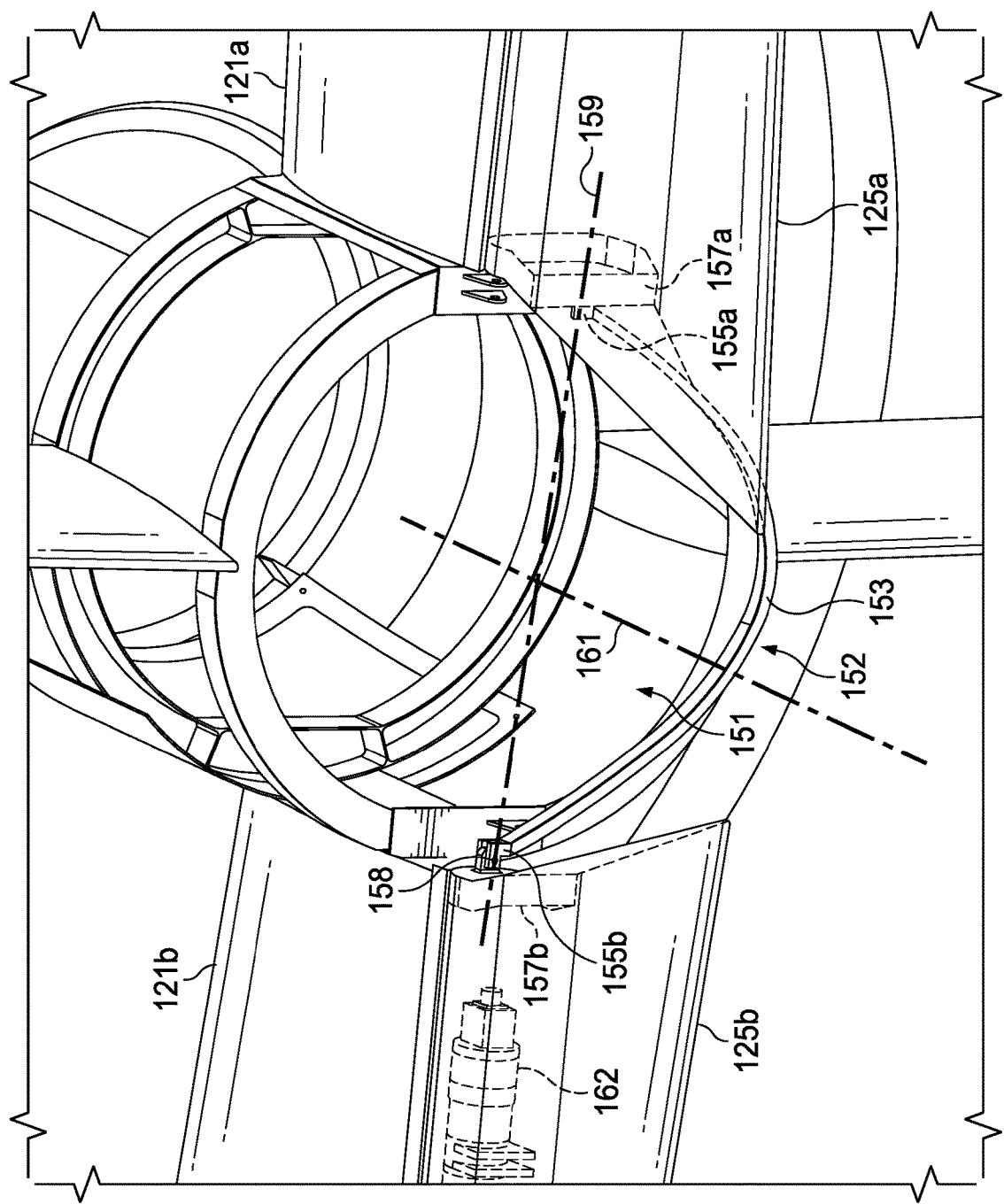
FIG. 6 a center body portion of the duct as depicted in FIG. 5 with an outer skin removed to illustrate internal components of the center body.

FIG. 5 is a bottom perspective view of duct 107 showing a center body 151 connected to hub 119. FIG. 6 illustrates a portion of duct 107 in which outer skin of center body 151 has been removed to expose a duct vane rotation system 152 including a structural hoop 153 disposed within center body 151 and having opposite ends connected to pitch horns 155a, 155b, provided on close out ribs 157a, 157b of hub-facing ends of control vanes 125a, 125b, respectively. As will be illustrated and described in greater detail below, ends of structural hoop 153 are connected to pitch horns 155a, 155b, via spherical joints 158a, 158b, which may be implemented using spherical bearings, such that control vanes 125a, 125b, rotate around a hinge line axis 159, while structural hoop rotates about a duct centerline axis 161.

In accordance with features of embodiments described herein, structural hoop 153 is a rigid element, which may be made of titanium or corrosion-resistant steel, for example. Pitch horns (or clevis ends) 155a, 155b, may be made of corrosion-resistant steel, for example. It will be recognized that the materials may be adjusted depending on the loads applied to the system 152. Closeout ribs 157a, 157b, may be aluminum machinings, for example, in which case pitch horns 155a, 155b, may be integral to the machinings.

As previously noted, an actuator 162 is provided in connection with one of the control vanes (e.g., outboard control vane 125b) for directly controlling rotation of the control vane, with the rotation being translated to the other control vane (e.g., inboard control vane 125a) by duct vane rotation system 152. In certain embodiments, actuator 162 is a rotary actuator. As shown in FIGS. 5 and 6, actuator 162 is situated in outboard control vane 125b and is structurally mounted to both the vane structure and outboard primary stator 121b. A central component of actuator 162 rotates approximately +/−25 degrees, thereby rotating the vane structure the same amount. This is accomplished by a centerline of actuator 162 being collocated with hinge line axis 159. Outer components of actuator 162 remain stationary by virtue of the fact that they are attached to outboard primary stator 121.

Figure 7A:
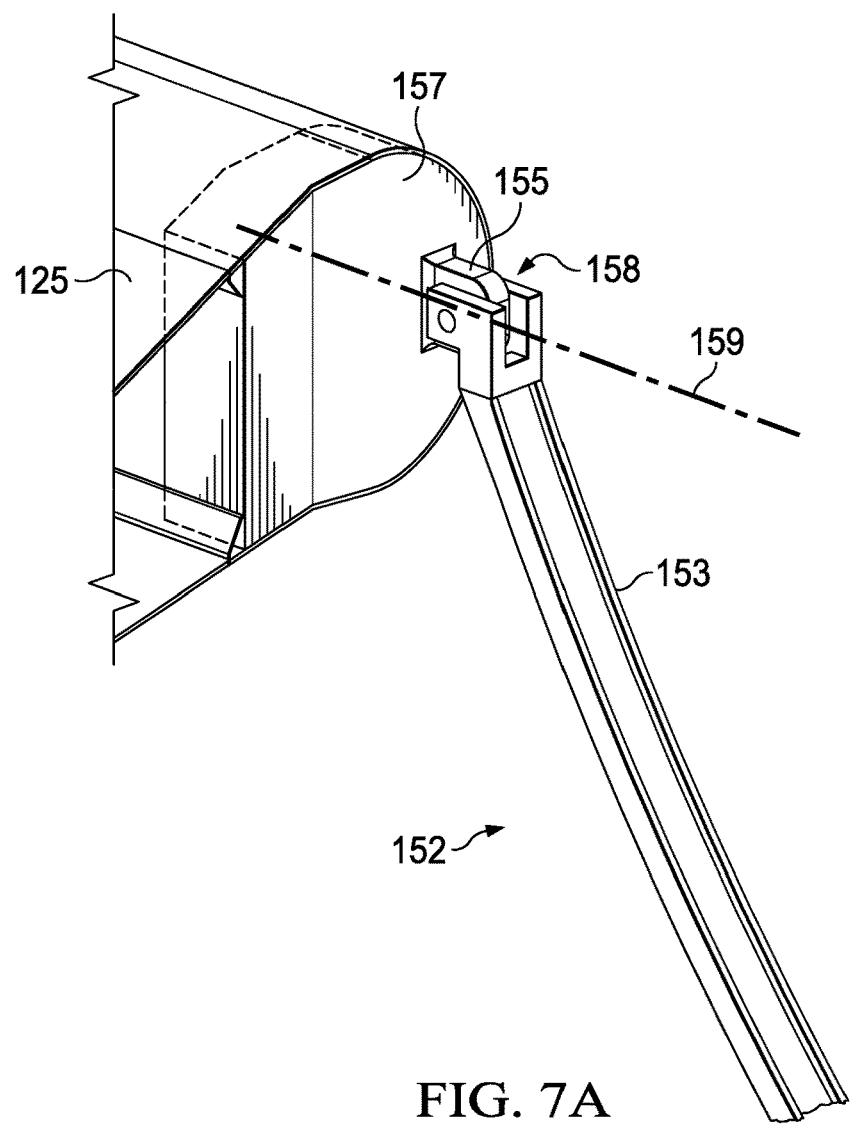
Figure 7B:
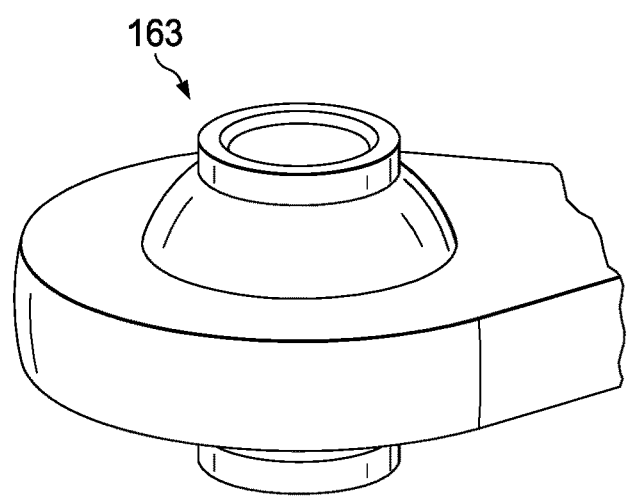

FIG. 7A is a more detailed depiction of duct vane rotation system 152 showing the connection of an end of structural hoop 153 to pitch horn 155 disposed on close out rib 157 of control vane 125 via a spherical joint 158. Referring also to FIG. 7B, in accordance with features of certain embodiments, spherical joint is implemented using a spherical bearing 163 that permits rotation of control vanes 125a, 125b about hinge line axis 159 and permits rotation of structural hoop 153 about duct centerline axis 161 while preventing hoop rotation about hinge line axis 159, thereby preserving space within center body 151.

In certain embodiments, spherical bearing 163 is located within the pitch horn 155, which in the illustrated embodiment comprises a U-mount. Bearing 163 bearing may be made of corrosion-resistant steel and may be self-lubricating and self-aligning. In certain embodiments, spherical bearing 163 is a "high misalignment" bearing, allowing for maximum spherical rotation. As a result, a ball portion of spherical bearing 163 is rounder and more exposed than other spherical bearings (e.g., low misalignment bearings). As a result, clevis ends of pitch horn 155 need only be about 1.5 inches apart to avoid interference during rotation. It will be recognized that a low misalignment bearing may also be used to implement spherical joint 158, with corresponding adjustments made in the distance between pitch horn clevis ends.

Referring to FIGS. 8 and 9, pitch horns 155a, 155b, are disposed on respective vane close out ribs 157a, 157b, equidistant from vane hinge line 159 in an X-Y plane 165.

Figure 10B:
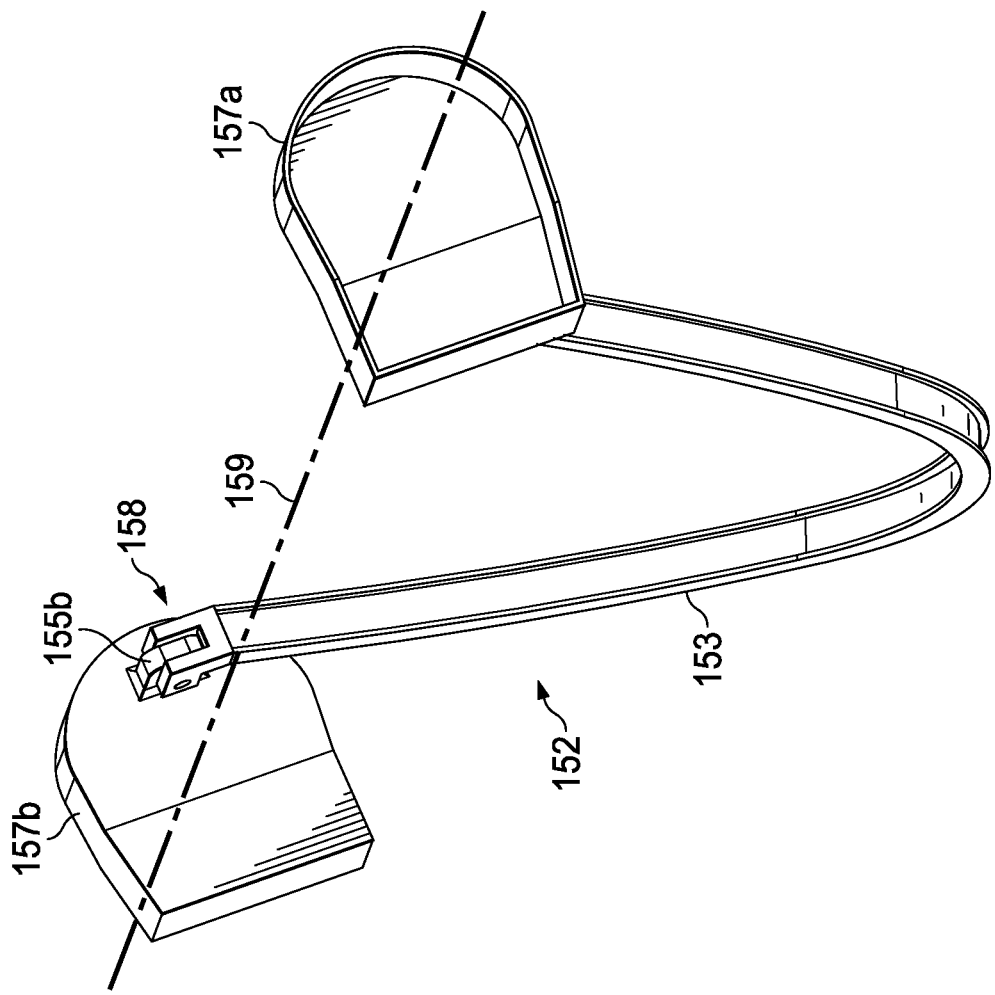
FIGS. 10A-10C illustrate relative positions of various structural elements of the duct as depicted in FIG. 5 when the duct vane rotation system is rotated about a vane hinge line to a maximum degree in a first (positive) direction.
Figure 10A:
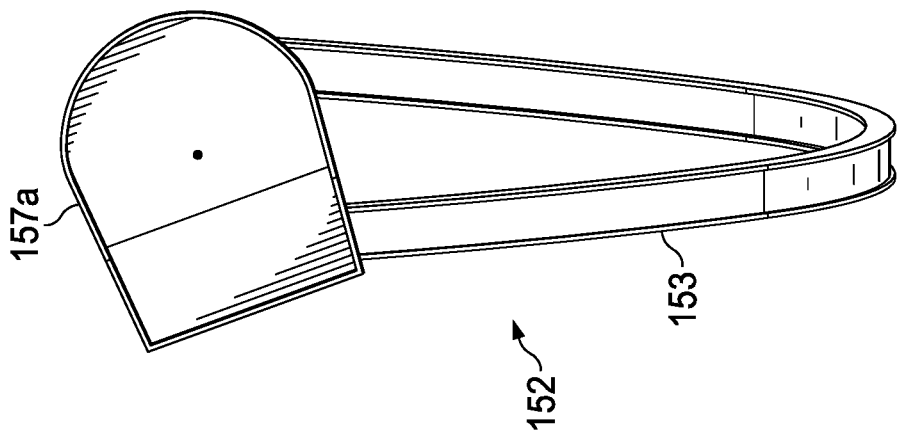
Figure 10C:
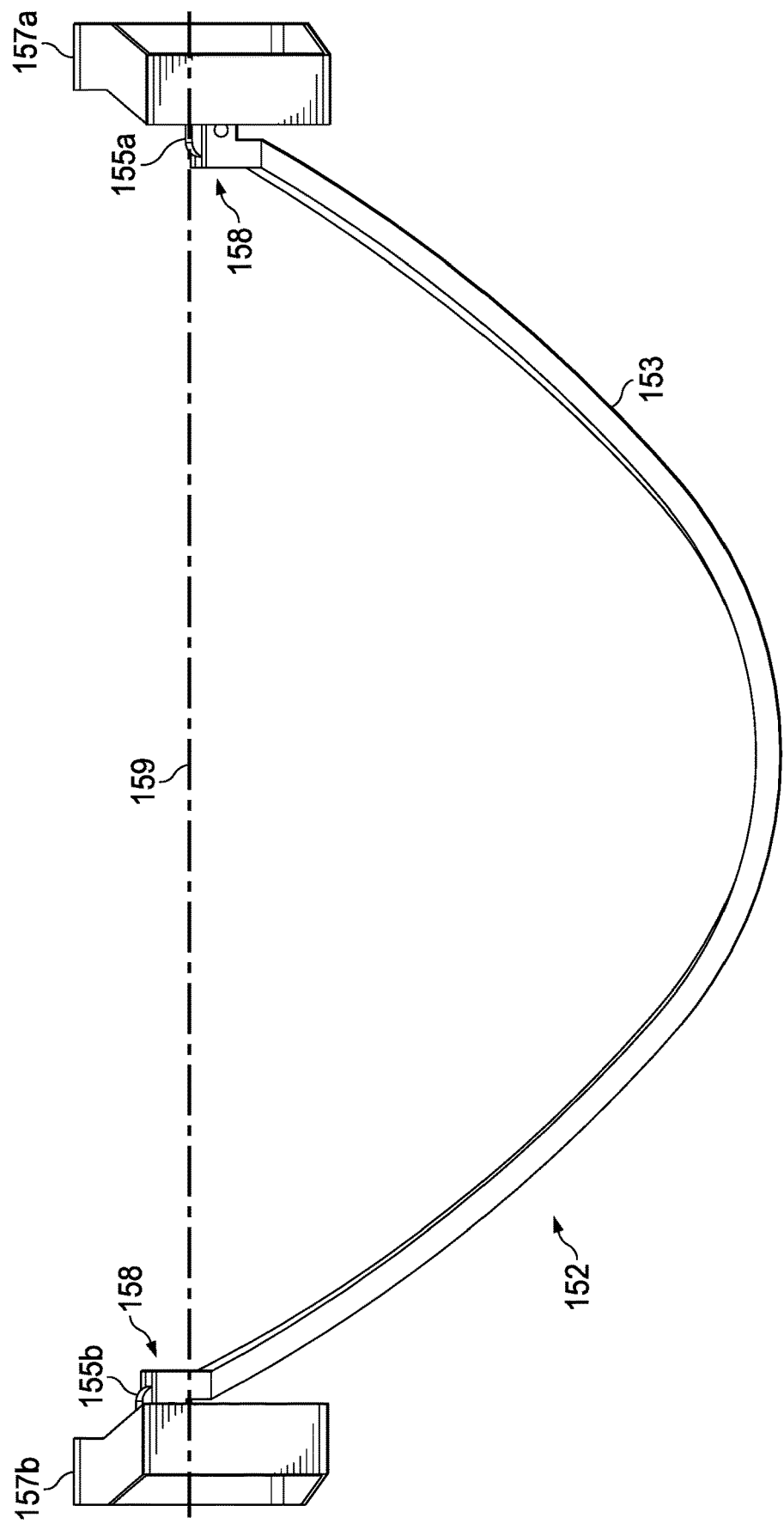

FIGS. 10A-10C illustrate various views of system 152 showing the relative positions of close out ribs 157a, 157b, and structural hoop 153 when vanes (not shown in FIGS. 10A-10C) are maximally positively rotated (e.g., approximately +25 degrees) about hinge line axis 159. In particular, FIG. 10A is a side view, FIG. 10B is a perspective view, and FIG. 10C is a front view. As best seen in FIG. 10C, a center point 171 of structural hoop 153 is not aligned with a centerline 173 of system 152; rather, it is slightly to the outboard side of system centerline 173.

Figure 11B:
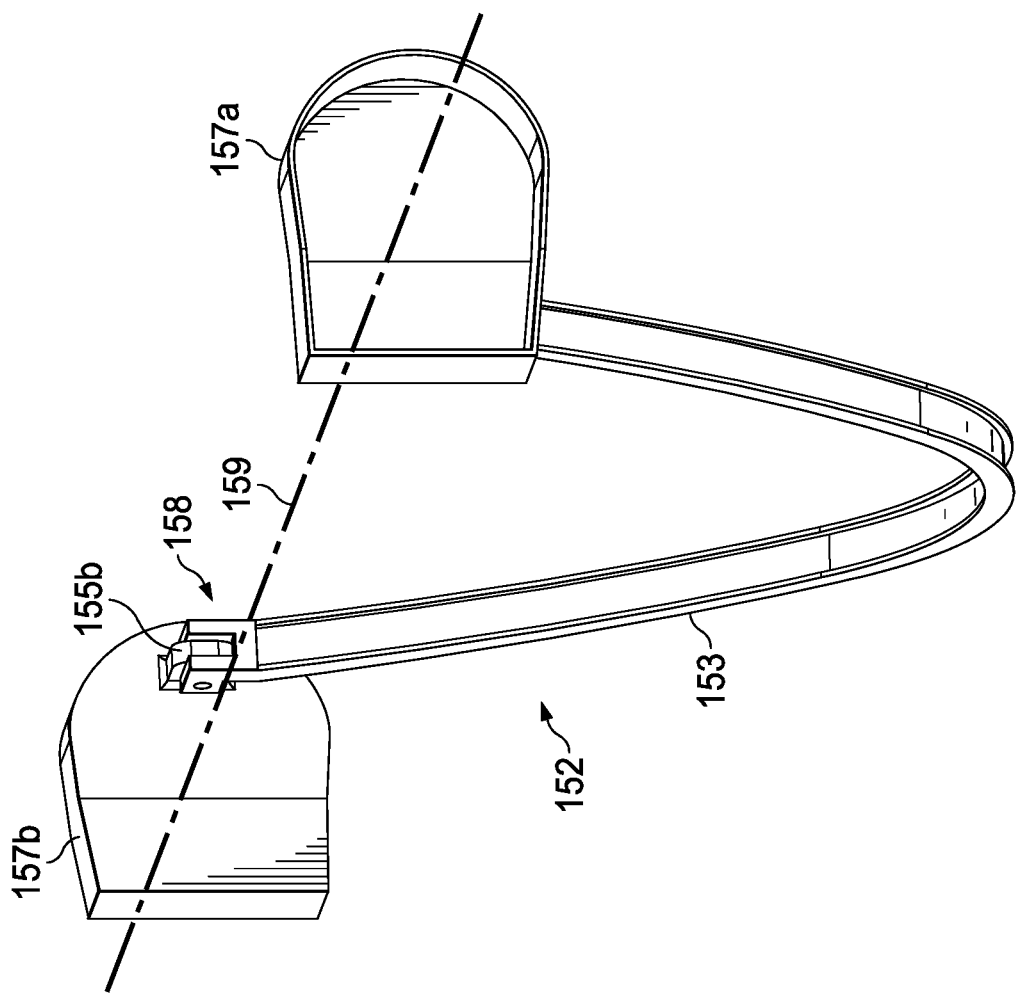
FIGS. 11A-11C illustrate relative positions of various structural elements of the duct as depicted in FIG. 5 when the duct vane rotation system in a neutral, unrotated, position about a vane hinge line.
Figure 11A:
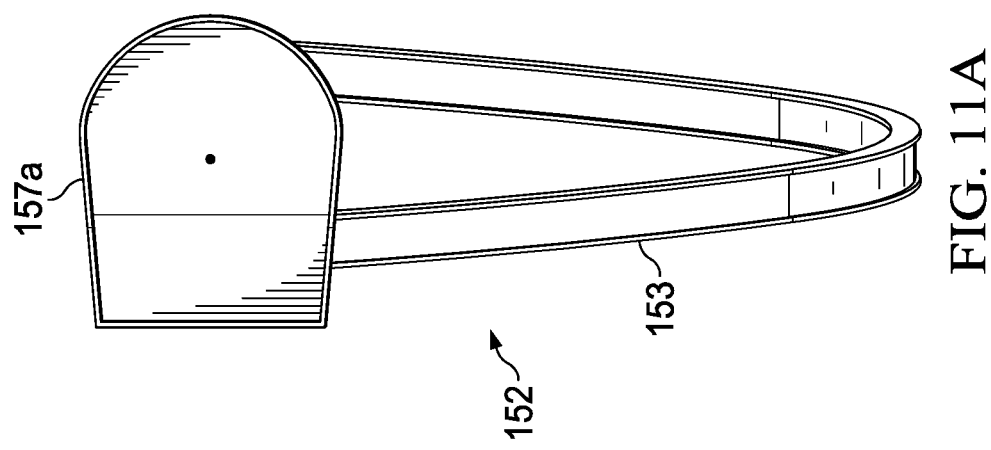
Figure 11C:
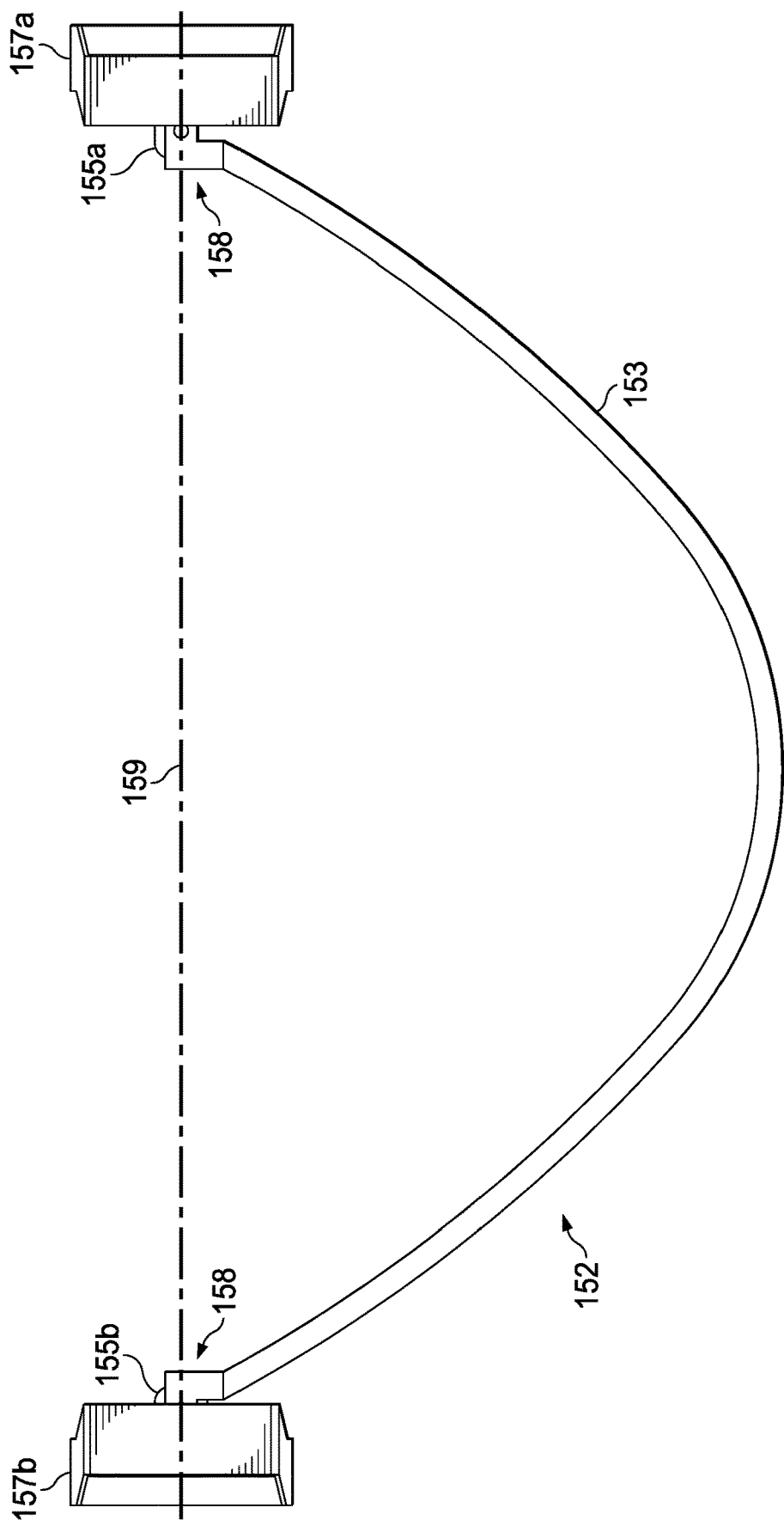

FIGS. 11A-11C illustrate various views of system 152 showing the relative positions of close out ribs 157a, 157b, and structural hoop 153 when vanes (not shown in FIGS. 11A-11C) are in a neutral position; that is, zero rotation about hinge line axis 159. In particular, FIG. 11A is a side view, FIG. 11B is a perspective view, and FIG. 11C is a front view. As best seen in FIG. 11C, center point 171 of structural hoop 153 is aligned with centerline 173 of system 152.

Figure 12C:
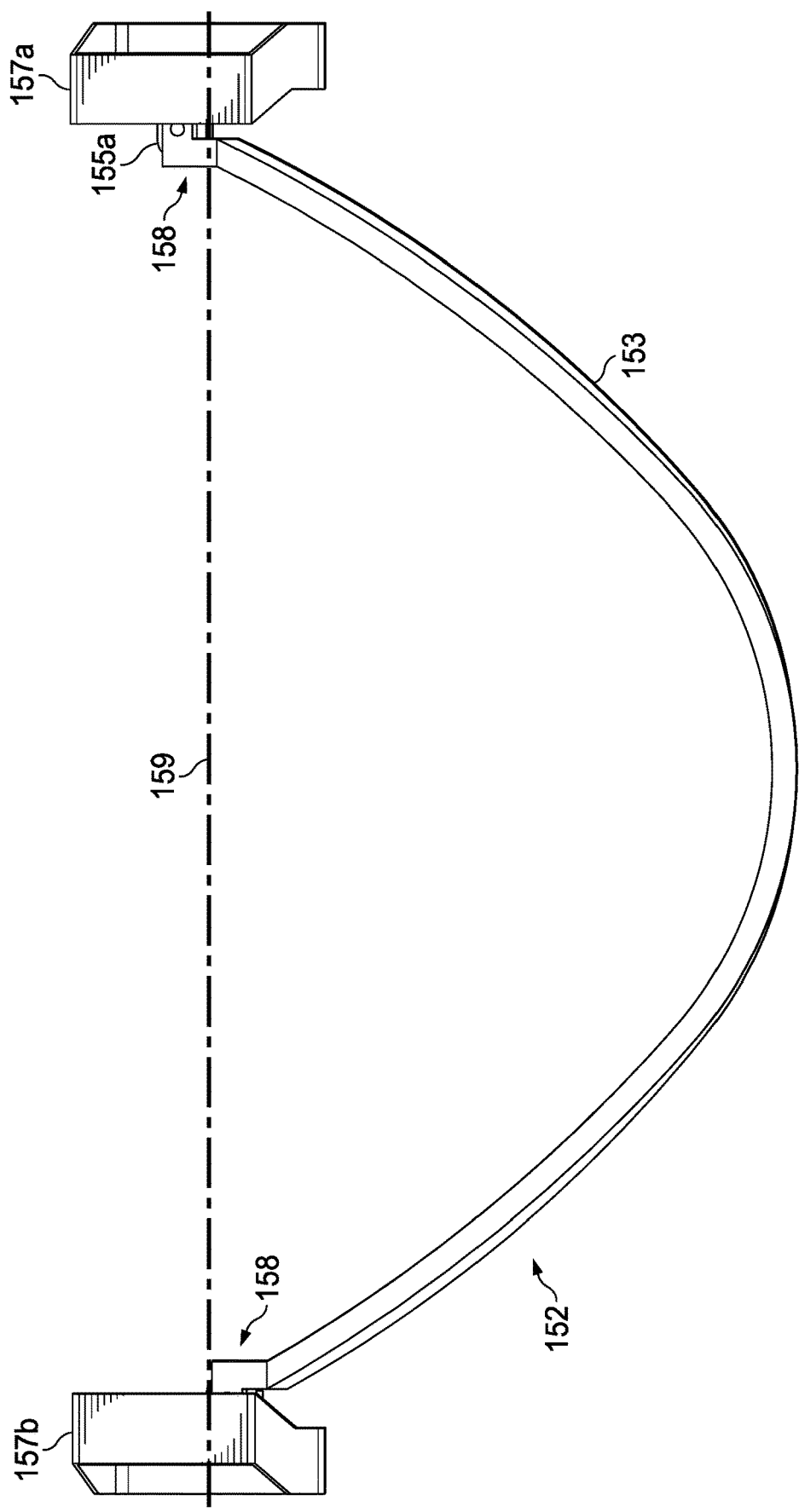

FIGS. 12A-12C illustrate various views of system 152 showing the relative positions of close out ribs 157a, 157b, and structural hoop 153 when vanes (not shown in FIGS. 12A-12C) are maximally negatively rotated (e.g., approximately −25 degrees) about hinge line axis 159. In particular, FIG. 12A is a side view, FIG. 12B is a perspective view, and FIG. 12C is a front view. As best seen in FIG. 12C, center point 171 of structural hoop 153 is not aligned with centerline 173 of system 152; rather, it is slightly to the inboard side of system centerline 173.

Figure 13:
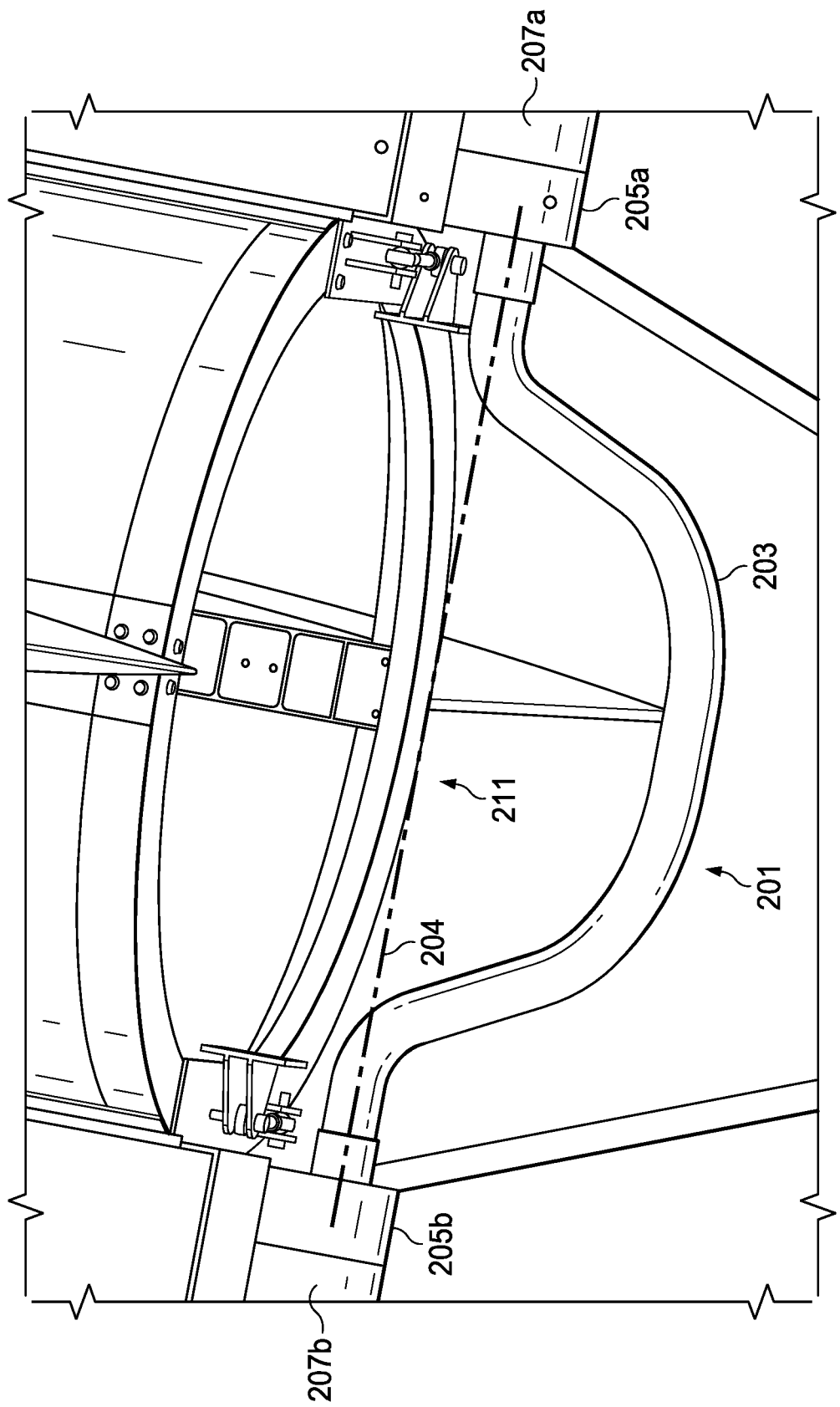
FIGS. 13-14 illustrate an alternative embodiment of a duct vane rotation system embodying features described herein.
Figure 14:
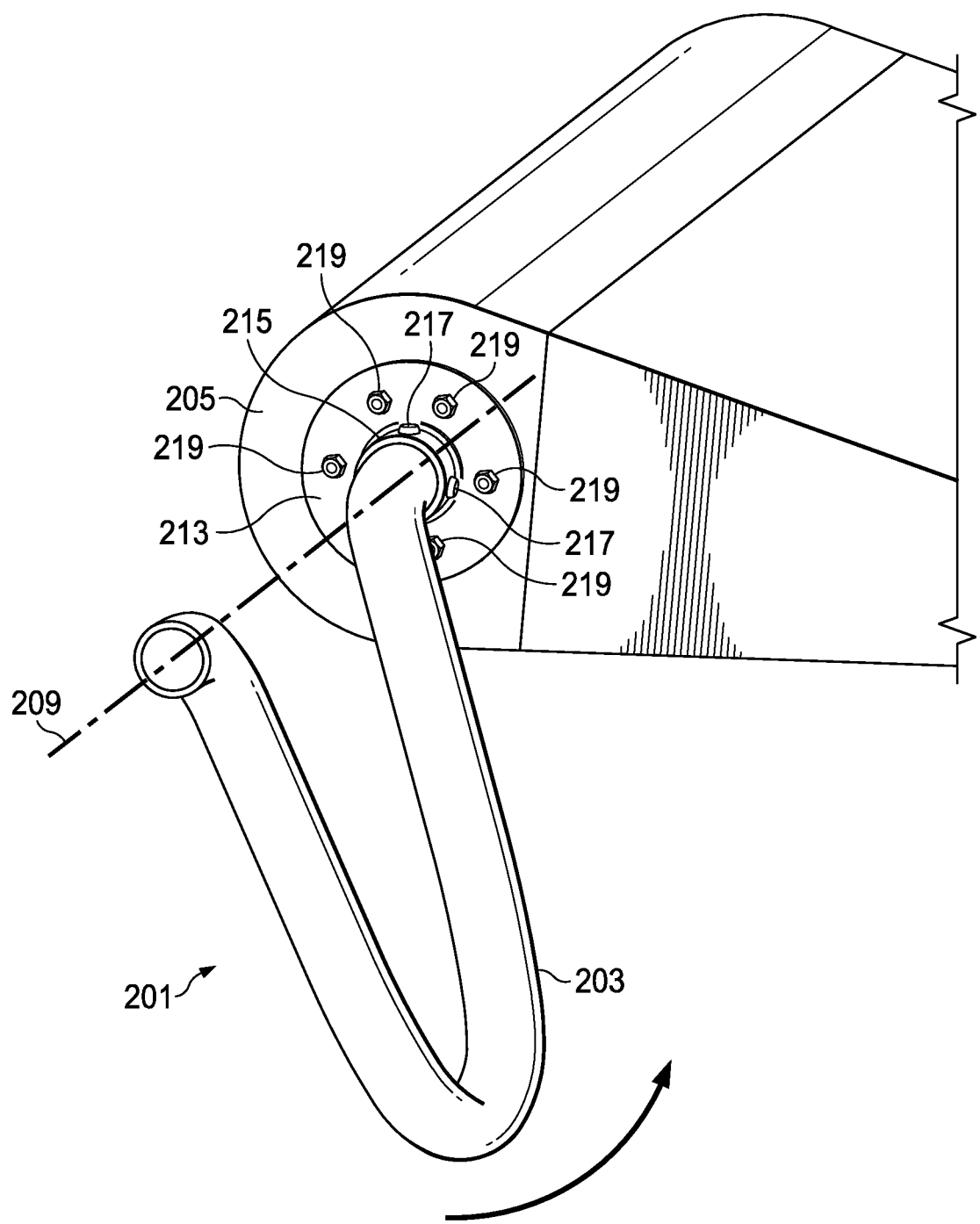

FIGS. 13-14 illustrate a duct vane rotation system 201 that includes a horseshoe-shaped torque tube 203 (instead of the structural hoop 153 of system 152) fixedly connected to vane closeout ribs 205a, 205b, at opposite ends thereof such that tube 203 rotates about with vanes 207a, 207b, about a hinge line axis 209. The unique shape of tube 203 prevents it from contacting components arranged within a center body portion 211.

In certain embodiments, horseshoe-shaped torque tube 203 is hollow, has a thickness of 0.1 inches and an internal diameter of 1 inch, and is made of aluminum. Each end of tube 203 is connected to a vane closeout ribs 205 via a fitting 213, which may be made of corrosion-resistant steel. Fitting 213 has a protruding section 215 with a large hole therein for accommodating an end of tube 203. Permanent fasteners 217 secure tube 203 to fitting 213, which is attached to closeout rib 205 via removable fasteners 219.

Example 1 is a rotor system including a duct ring; a hub disposed centrally to the duct ring; first and second stators each connected between the duct ring and the hub; first and second control vanes rotatably connected to the first and second stators, respectively; and a structural hoop having a first end connected to the first control vane and a second end connected to the second control vane, the structural hoop for translating rotation of the first control vane about a vane axis to the second control vane.

In Example 2, the rotor system of Example 1 may further include the first and second stators being longitudinally aligned relative to one another on opposite sides of the hub.

In Example 3, the rotor system of any of Examples 1-2 may further include the first and second control vanes comprising outboard and inboard control vanes, respectively.

In Example 4, the rotor system of any of Examples 1-3 may further include an actuator for causing rotation of the first control vane about the vane axis responsive to control signals received by the actuator.

In Example 5, the rotor system of any of Examples 1-4 may further include the first and second ends of the structural hoop being connected to close-out ribs of the first and second control vanes.

In Example 6, the rotor system of any of Examples 1-5 may further include each of the close-out ribs comprising a pitch horn.

In Example 7, the rotor system of any of Examples 1-6 may further include the first and second ends of the structural hoop being connected to the pitch horns via spherical joints.

In Example 8, the rotor system of any of Examples 1-7 may further include the spherical joints comprising high misalignment bearings.

In Example 9, the rotor system of any of Examples 1-8 may further include the first and second control vanes being rotatable approximately ±25 degrees about a hinge line axis.

In Example 10, the rotor system of any of Examples 1-9 may further include the first and second ends of the structural hoop being fixedly connected to the first and second control vanes.

Example 11 is an aircraft including a fuselage and a rotor system including a duct ring; a hub disposed centrally to the duct ring; first and second stators each connected between the duct ring and the hub; first and second control vanes rotatably connected to the first and second stators, respectively; and a structural hoop having a first end connected to the first control vane and a second end connected to the second control vane, the structural hoop for translating rotation of the first control vane about a vane axis to the second control vane.

In Example 12, the aircraft of Example 11 may further include the first and second stators being longitudinally aligned relative to one another on opposite sides of the hub.

In Example 13, the aircraft of any of Examples 11-12 may further include the first and second control vanes comprising outboard and inboard control vanes, respectively.

In Example 14, the aircraft of any of Examples 11-13 may further include an actuator for causing rotation of the first control vane about the vane axis responsive to control signals received by the actuator.

In Example 15, the aircraft of any of Examples 11-14 may further include the first and second ends of the structural hoop being connected to close-out ribs of the first and second control vanes.

In Example 16, the aircraft of any of Examples 11-15 may further include each of the close-out ribs comprising a pitch horn.

In Example 17, the aircraft of any of Examples 11-16 may further include the first and second ends of the structural hoop being connected to the pitch horns via spherical joints.

In Example 18, the aircraft of any of Examples 11-17 may further include the spherical joints comprising high misalignment bearings.

In Example 19, the aircraft of any of Examples 11-18 may further include the first and second control vanes being rotatable approximately ±25 degrees about a hinge line axis.

In Example 20, the aircraft of any of Examples 11-19 may further include the first and second ends of the structural hoop being fixedly connected to the first and second control vanes.

It should be appreciated that aircraft illustrated herein, such as aircraft 101, is merely illustrative of a variety of aircraft that can implement the embodiments disclosed herein. Indeed, the various embodiments described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein can be integrated into a variety of aircraft configurations. It should be appreciated that even though aircraft are particularly well-suited to implement the embodiments of the present disclosure, non-aircraft vehicles and devices can also implement the embodiments.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system comprising:
   a duct ring;
   a hub disposed centrally to the duct ring;
   first and second stators each connected between the duct ring and the hub;
   first and second control vanes rotatably connected to the first and second stators, respectively; and
   a structural hoop having a first end connected to the first control vane and a second end connected to the second control vane, the structural hoop for translating rotation of the first control vane about a vane axis to the second control vane.

2. The rotor system of claim 1, wherein the first and second stators are longitudinally aligned relative to one another on opposite sides of the hub.

3. The rotor system of claim 1, wherein the first and second control vanes comprise outboard and inboard control vanes, respectively.

4. The rotor system of claim 1 further comprising an actuator for causing rotation of the first control vane about the vane axis responsive to control signals received by the actuator.

5. The rotor system of claim 1, wherein the first and second ends of the structural hoop are connected to close-out ribs of the first and second control vanes.

6. The rotor system of claim 5, wherein each of the close-out ribs comprises a pitch horn.

7. The rotor system of claim 6, wherein the first and second ends of the structural hoop are connected to the pitch horns via spherical joints.

8. The rotor system of claim 7, wherein the spherical joints comprise high misalignment bearings.

9. The rotor system of claim 1, wherein the first and second control vanes are rotatable approximately ±25 degrees about a hinge line axis.

10. The rotor system of claim 1, wherein the first and second ends of the structural hoop are fixedly connected to the first and second control vanes.

11. An aircraft comprising:
    a fuselage; and
    a rotor system comprising:
       a duct ring;
       a hub disposed centrally to the duct ring;
       first and second stators each connected between the duct ring and the hub;
       first and second control vanes rotatably connected to the first and second stators, respectively; and
       a structural hoop having a first end connected to the first control vane and a second end connected to the second control vane, the structural hoop for translating rotation of the first control vane about a vane axis to the second control vane.

12. The aircraft of claim 11, wherein the first and second stators are longitudinally aligned relative to one another on opposite sides of the hub.

13. The aircraft of claim 11, wherein the first and second control vanes comprise outboard and inboard control vanes, respectively.

14. The aircraft of claim 11 further comprising an actuator for causing rotation of the first control vane about the vane axis responsive to control signals received by the actuator.

15. The aircraft of claim 11, wherein the first and second ends of the structural hoop are connected to close-out ribs of the first and second control vanes.

16. The aircraft of claim 15, wherein each of the close-out ribs comprises a pitch horn.

17. The aircraft of claim 16, wherein the first and second ends of the structural hoop are connected to the pitch horns via spherical joints.

18. The aircraft of claim 17, wherein the spherical joints comprise high misalignment bearings.

19. The aircraft of claim 11, wherein the first and second control vanes are rotatable approximately ±25 degrees about the vane axis.

20. The aircraft of claim 11, wherein the first and second ends of the structural hoop are fixedly connected to the first and second control vanes.

* * * * *